United States Patent [19]
Hayasaka et al.

[11] Patent Number: 5,478,670
[45] Date of Patent: Dec. 26, 1995

[54] NON-AQUEOUS ELECTROLYTE ELECTROCHEMICAL CELL COMPRISING HIGH NI AUSTENITIC STAINLESS STEEL POSITIVE ELECTRODE CASE

[75] Inventors: Toyoo Hayasaka; Toyoo Harada; Tsugio Sakai; Junko Ohshida, all of Sendai, Japan

[73] Assignee: Seiko Electronic Components, Ltd., Japan

[21] Appl. No.: 153,586

[22] Filed: Nov. 17, 1993

[30] Foreign Application Priority Data

Nov. 26, 1992 [JP] Japan ............ 4-317296
Sep. 28, 1993 [JP] Japan ............ 5-241593

[51] Int. Cl.⁶ .................................. H01M 2/08
[52] U.S. Cl. ............ 429/175; 429/177; 429/183; 429/180
[58] Field of Search ................... 429/175, 177, 429/183, 180

[56] References Cited

U.S. PATENT DOCUMENTS

4,824,745  4/1989  Ogawa et al. ............ 429/213

FOREIGN PATENT DOCUMENTS

| 0441589 | 8/1991 | European Pat. Off. . |
| 0441583 | 8/1991 | European Pat. Off. . |
| 8802316 | 9/1988 | France . |
| 3918963 | 12/1989 | Germany . |
| 5133755 | 10/1980 | Japan . |
| 55028238 | 2/1990 | Japan . |
| 02126554 | 5/1990 | Japan . |
| 03240215 | 10/1991 | Japan . |
| 04010365 | 1/1992 | Japan . |
| 04121962 | 4/1992 | Japan . |

OTHER PUBLICATIONS

Hirima, et al. Chem. Abstr. 113:118,478s 13 Oct. 1990.
Hiroshi, et al. Pat. Abstr. of Japan vol. 16 No. 158 (E–1191) 17 Apr. 1992.
Patent Abstracts of Japan, vol. 14, No. 358 (E–959) 3 Aug. 1990.
Chemical Abstracts, vol. 116, No. 26, 29 Jun. 1992 Columbus, Ohio, Abs. No. 259064c, H. Hattori et al.
J. Electrochemical Society, vol. 132, No. 1, Jan. 1985, Manchester, N.H., pp. 125–126, N. A. Fleischer et al., "Galvanic Action Between $MnO_2$–Metal Couples and Its Effect on the Discharge of $Li/MnO_2$ Cells".
Patent Abstracts of Japan, vol. 16, No. 158 (E–1191) 17 Apr. 1992.
Patent Abstracts of Japan, vol. 4, No. 59 (E–009) 2 May 1980.
Patent Abstracts of Japan, vol. 16, No. 381 (E–1248) 14 Aug. 1992.

*Primary Examiner*—Olik Chaudhuri
*Assistant Examiner*—C. Everhart
*Attorney, Agent, or Firm*—Adams & Wilks

[57] ABSTRACT

A non-aqueous electrolyte electrochemical cell comprises a negative electrode, a positive electrode, a non-aqueous electrolyte, a positive electrode case and a negative electrode case. The positive electrode case comprises a high-grade corrosion resistibility stainless steel having a pitting index between 30.5 and 45, the pitting index being calculated by the formula Cr %+3×Mo %+16×N %. An enhanced pressure sealed electrochemical cell can be manufactured in which the production cost of the positive electrode case is reduced and the productivity of the electrochemical cell improved by suppression of anodic oxidation of the positive electrode case.

19 Claims, 4 Drawing Sheets

PRIOR ART

NON-AQUEOUS ELECTROLYTE ELECTROCHEMICAL CELL COMPRISING HIGH NI AUSTENITIC STAINLESS STEEL POSITIVE ELECTRODE CASE

BACKGROUND OF THE INVENTION

The present invention relates to small size electrochemical cells of high capacity.

In the prior art of wet-type electrochemical cells, for the positive electrode case an, austenitic ferrite stainless steel material (SUS329J1), which has an aluminum layer inside of the case, is used (hereinafter briefly specified as Al-SUS clod materials) as referenced in the Japanese laid-open patent 62-94908.

FIG. 5 shows a sample constitution of an electric double-layer capacitor in a prior art electrochemical cell. The polarization electrode 3, 3' comprises actuated carbon fiber cloth, on which of one side of each is formed a collector 4, 4' made of aluminum through a plasma spraying method, and the actuated carbon fiber cloth is welded to positive electrode case 1, 2 and negative electrode case 7 through, for example, a laser welding method. The electrodes 3, 3' are coupled to each other by way of a separator 5, and assembled by bending an upper side of the positive electrode case towards the inside surface after organic electrolytic liquid 6 is poured into it. As for the electrolytic liquid, a solvent is used in which a tetra-alkylammonium compound, tetra-alkylphosphonium compound etc. is melted into solvents of aprotic r-butyl lactone ethylene carbonate, propylene carbonate, etc.

When the aforesaid prior art electrochemical cell is usually used in the voltage range of 2–2.8 V, anodization of the inside of the positive electrode case, which is made of the element of stainless steel only, is accelerated, solution of metal ion becomes more active, and thus higher impedance in the cell or decrease in electric capacity can be observed. In order to suppress the anodization an, aluminum layer is set inside of the positive electrode case.

Because of the above, a simple substance of JIS standard SUS329J1, or SUS449J1 cannot be used as the materials for the positive electrode case and instead a laminated of two different metals of stainless steel and aluminum is used as the materials for the positive electrode case. However, a uniform and equally thick aluminum layer is difficult to achieve during manufacturing and multiple lamination processes are necessary for its production. Therefore its cost is more than several times as much as of a simple substance stainless steel.

Moreover, during the pressing process, an aluminum layer sometimes is placed over the upper side edge of the positive electrode case. At the assembling process the positive electrode case 1, 2 and the negative electrode case by bending the positive electrode case towards the inside at the edge and by shielding the cell, aluminum at the inside of the positive electrode case comes off and small fragments of aluminum become coupled with the negative electrode case 3. This becomes a reason for a short-circuit. Even when an aluminum layer does not cover the edge of the stainless steel, it invites divergence in shielding between the positive electrode case and the negative electrode case in, and this becomes too a reason for a short-circuit.

According to the present invention, during use of an electrochemical cell with organic electrolytic liquid at a level of 2–2.8 V, anodization of a positive electrode cell without using a aluminum layer inside of it can be suppressed, the product cost can be decreased and therefore its productivity can be improved.

SUMMARY OF THE INVENTION

An object of the present invention is to provide a small size electrochemical cell having a high capacity.

Another object of the present invention is to provide a non-aqueous electrolyte electrochemical cell capable of operating at the highest working voltage of 2.8 V.

Still another object of the present invention is to provide a non-aqueous electrolyte electrochemical cell using a stainless steel of low cost for a positive electrode case.

A further object of the present invention is to provide a non-aqueous electrolyte electrochemical cell using a stainless steel having a pitting index between 30.5 and 45 for a positive electrode case.

The aforesaid problems above can be solved according to the present invention in that for the materials of the positive electrode cell some kinds of high Ni austenitic stainless steel or high pressure tightness austenitic ferrite duplex or two phase stainless steel are used.

According to the present invention, an electrochemical cell at the highest working voltage of 2.8 V can, be obtained by way of the above means.

High Ni austenitic stainless steel used in this invention is high Cr, high Mo austenitic stainless steel. That is, it has a higher content of Cr and Mo than conventional austenitic stainless steel. An example, is JIS standard SUS317J4L which shows very good corrosion resistivity even in severe atmospheres. Table 1 exhibits the data of chemical components of high Cr, high Mo austenitic stainless steel SUS317J4L.

[TABLE 1]

| C | Si | Mn | Ni | Cr | Mo | N |
|---|---|---|---|---|---|---|
| % ≦0.030 | ≦1.00 | ≦1.00 | 24.00 26.00 | 22.00 24.00 | 5.00 6.00 | 0.170 0.220 |

SUS329J4L, which is a kind of austenitic ferrite duplex stainless steel, and of which a representative sample is 25cr-6Ni-3.5 Mo, shows also good corrosion resistibility, although it is a little bit inferior to SUS317J4L. The table 2 exhibits the data of the chemical components of SUS329J4L.

[TABLE 2]

| C | Si | Mn | Ni | Cr | Mo | N |
|---|---|---|---|---|---|---|
| % ≦0.030 | ≦1.00 | ≦1.50 | 5.50 7.50 | 24.00 26.00 | 2.50 3.50 | 0.08 0.20 |

Even when the inside surface of each electrochemical cell with a positive electrode case made of both above materials contacts directly with an organic electrolytic liquid or positive electrode, anodization of the positive electrode will be suppressed because of its high corrosion resistivity.

DETAILED DESCRIPTION OF THE PREFERRED EMBODIMENTS

Hereinafter the present invention will be described in connection to the accompanying drawings.

(Embodiment 1)

Corrosion tests on miscellaneous stainless steels in aqueous solutions were made.

Figure 2:
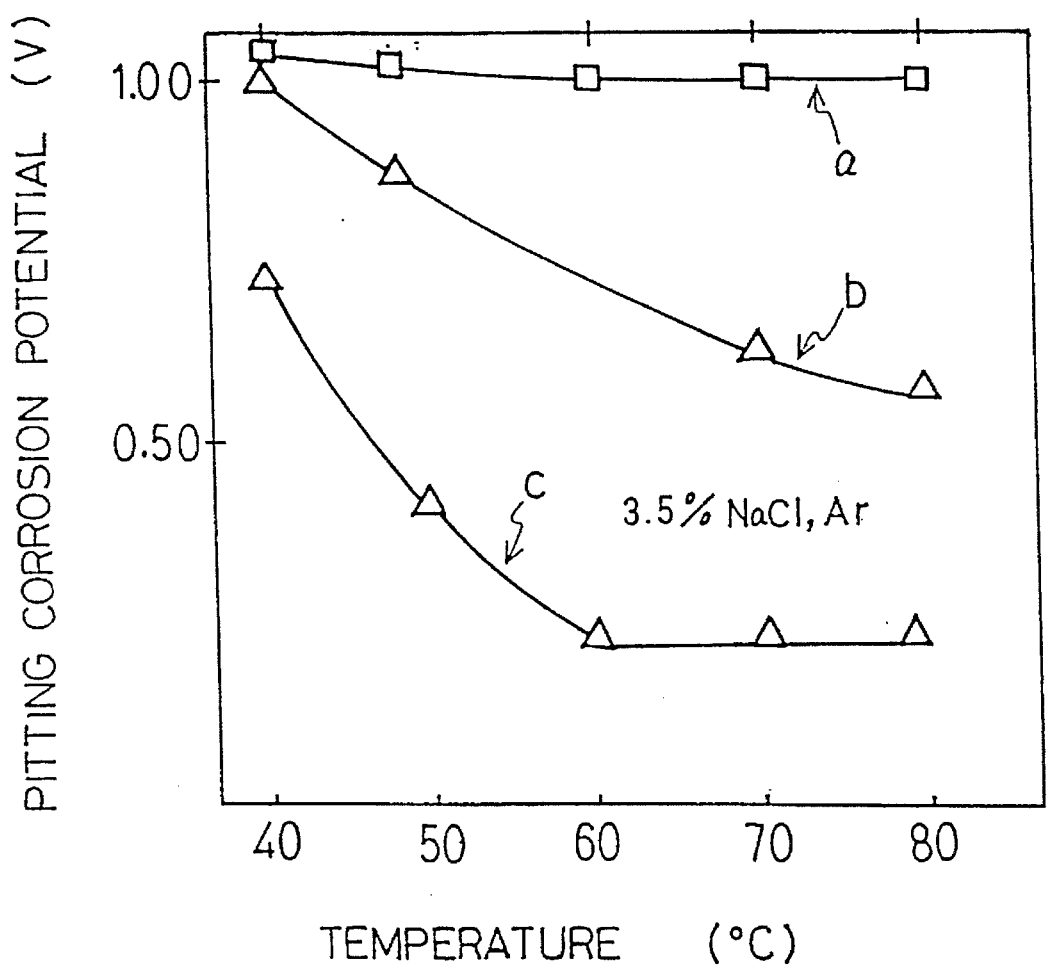
FIG. 2 shows a graph of the dependency of pitting corrosion potential to temperature on various stainless steels.

FIG. 2 shows the pitting corrosion potential in relation to different temperatures in aqueous solutions of miscellaneous chlorides. a and b in FIG. 2 show respectively, characteristics of SUS317J4L and SUS329J4L used in this invention, and c shows characteristics of SUS329J1. When the temperature becomes higher, the pitting corrosion potential of a does not change and that of b decreases, but the corrosion resistibility of both a and b is good. The pitting corrosion potential of c decreases drastically in relation to higher temperature, and the corrosion resistibility of c is not good.

(Embodiment 2)

Concerning miscellaneous stainless steel is tested the voltage/current characteristics of $Li/Li^+$ reference electrode on anode electrode and on a cathode electrode. In this test, tetraethylamonium tetrafluoroborate [$(C_2H_{54}NBF_4)$] is dissolved into proplene carbonate as for the battery electrolyte.

Figure 3:
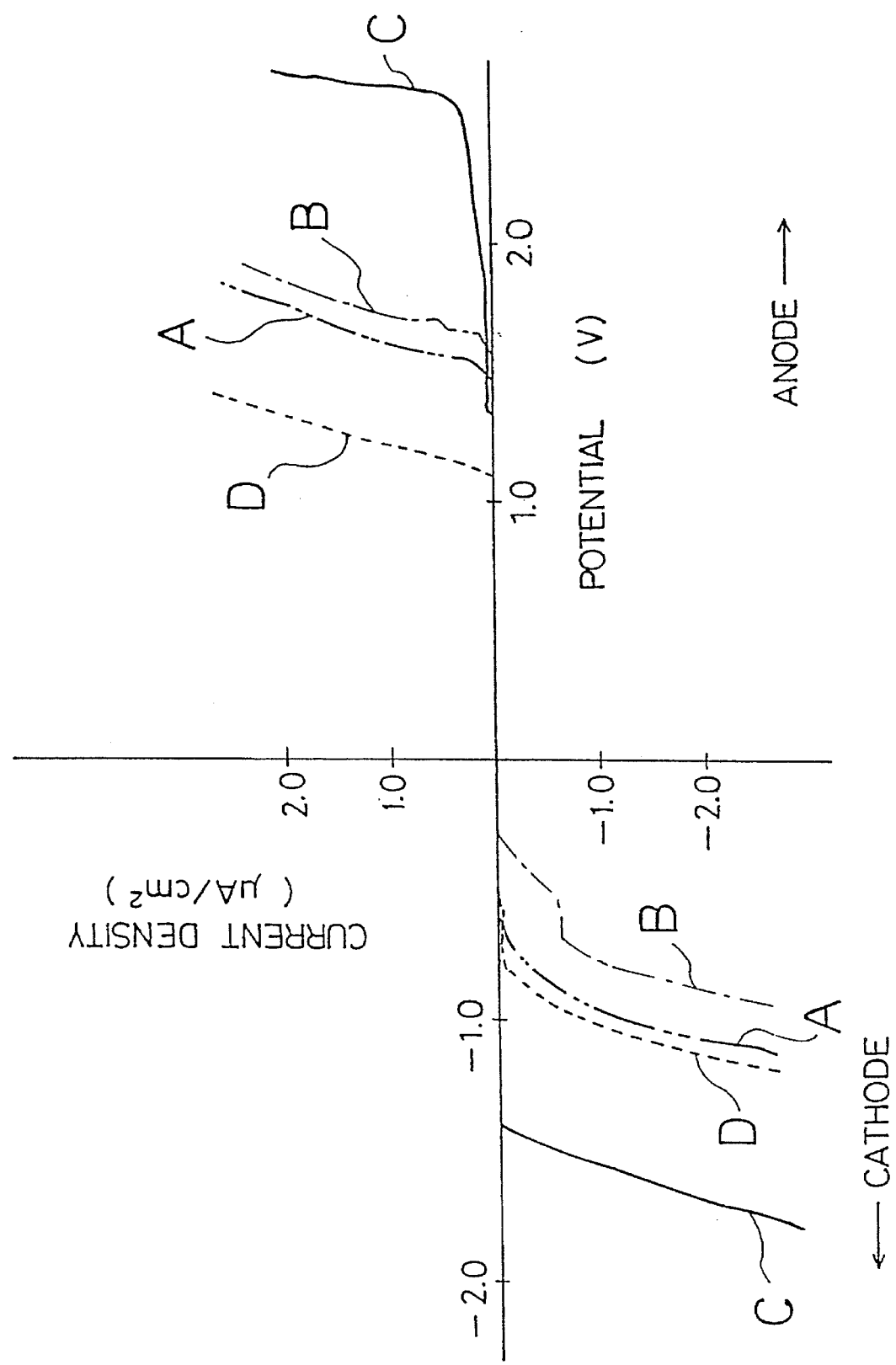
FIG. 3 shows a graph of a voltage/current curve of various metals.

In FIG. 3, A and B represent, respectively, an element of SUS317J4L stainless steel and element of SUS329J4L stainless steel, in this invention. C and D are for comparison purposes and represent the prior art, showing voltage/current characteristics, respectively, of aluminum-laminated SUS329J1 and an element of SUS329J1 stainless steel. A metal dissolution reaction occurs at the anode electrode (cathode electrode for the cell). When the electric voltage is swept, the anode reaction increases to the neighborhood of 1.6 V for A and 1.7 V for B in this invention, and at the neighborhood for +2.6 V of C and 1.2 V for D in the prior art, all the aforesaid voltages being at the current density of 1 $\mu A/cm^2$.

FIG. 3 shows profiles at the twelfth sweep in repetition. Since the highest voltage of the cell's cathode electrode (anode electrode in FIG. 3) is measured at +1.2 V (for the reference −1.6 V at the anode electrode at the cell's maximum usage voltage 2.8 V) A's and B's dissolution reaction in the positive electrode does not occur because both are at the higher position than at the cell's cathode electrode voltage. D has a problem in its usage of the element itself because D's dissolving reaction occurs from at +1.2 V, where it is equivalent to the voltage (1.2 V) on cell's cathode electrode, and C's initial voltage of the dissolution reaction is higher because an oxide film is formed on the surface of the aluminum at the time of the voltage sweep.

Generally speaking, it is said that the corrosion resistance of stainless steel is affected more by the inclusion volume of Cr, Mo and less by that of Ni, Cu, N. Pitting index (PI) is known as an indicator of corrosion resistance and is shown as PI=Cr %+3×Mo %+16×N %.

[TABLE 3]

|  | Present invention | | Prior art |
|---|---|---|---|
|  | SUS317J4L | SUS329J4L | SUS329J1 |
| PI value | 42.0 | 36.5 | 30.1 |

The higher the PI value is, the better corrosion resistance there is. But at the 45–50 or more range of PI, the processability and mechanical characteristics of materials become inferior, hence specifications for a positive electrode case is not fulfilled by using such materials. A different evaluation of corrosion resistance which resembles that of PI is mentioned in J. Kolts, J. B. C. Wu. P. E. Manning, and A. I. Asphahani, "Highly Alloyed Austenitic Material for Corrosion Resistance", Corrosion Reviews, 6(4), P279-326 (1986).

Figure 4:
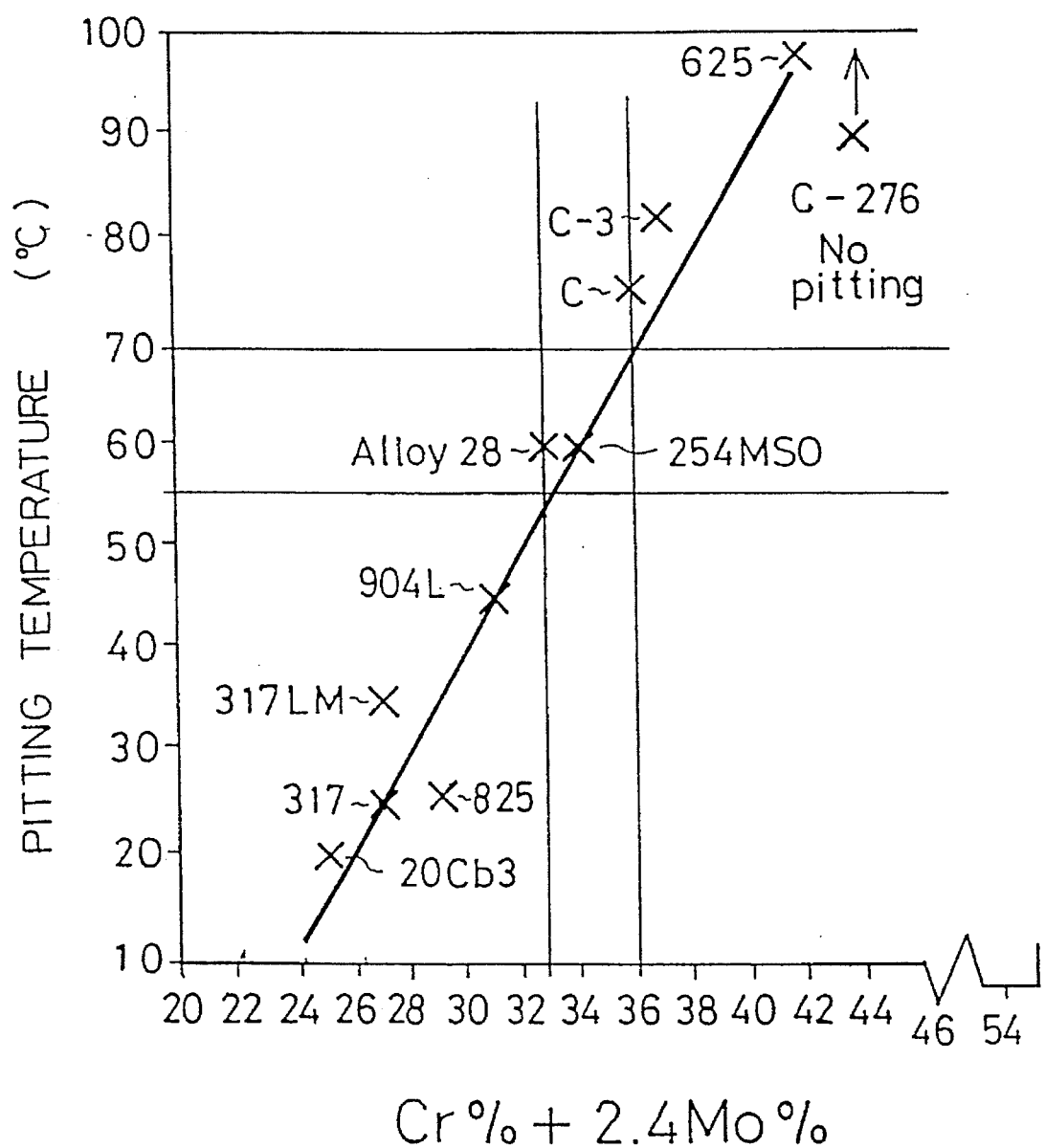
FIG. 4 shows a graph of the composition (percentage) of Cr and Mo in relation to pitting temperature, which is extracted from a know literature.

FIG. 4 is extracted from the above reference, and shows the relation of critical temperature for pitting and composition for Fe—Ni—Cr—Mo alloys where the corrosion of Fe—Ni—Cr—Mo alloys is tested in the a solvent of 4% NaCl+1% $Fe_2(SO_4)_3$+ 0.01 MHCl.

As shown in FIG. 4, the higher the total of Cr %+2.4 Mo % is, the higher the corrosion temperature is according to the calculation of pitting temperatures of SUS317J4L and SUS329J4L in this invention, of which Cr % and Mo % is referred for using the FIG. 4 above. The figures in the temperature range 55°– 70° C. are estimated, and this expects that the corrosion resistance may be at considerably higher temperatures.

(Embodiment 3)

Figure 1:
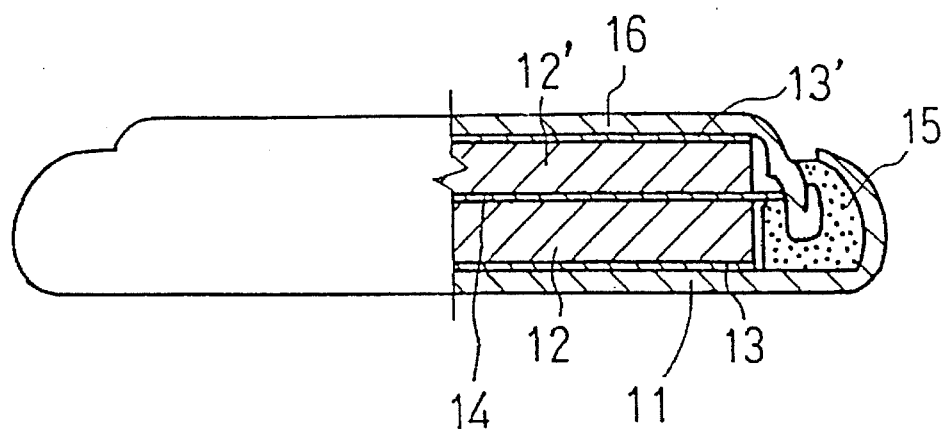
FIG. 1 is a schematic partial cross-section showing the inside structure of an electrochemical cell according to the present invention.
Figure 5:
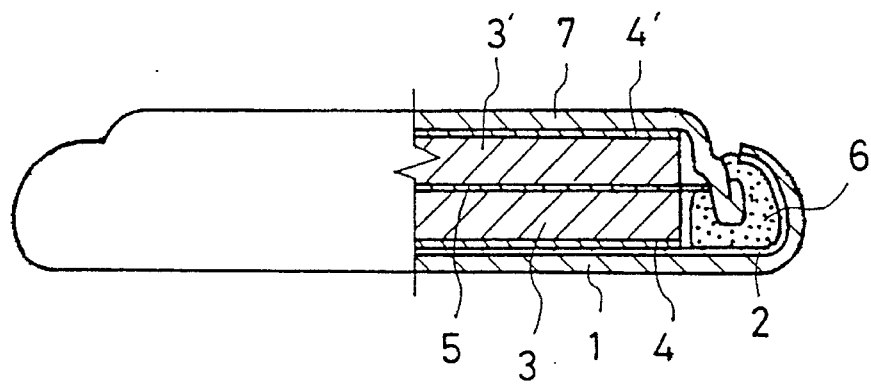
FIG. 5 show a vertical section in partial cross section of the inside structure of an electric double-layer capacitor of a traditional electrochemical cell sample.
Figure 6:
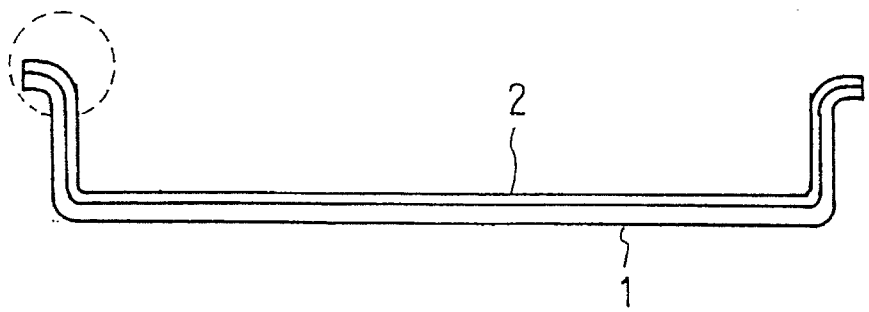
FIG. 6 shows vertical section of a traditional positive pole case with a magnified part.

Through a pressing process, positive electrode cases are made with SUS317J4L of high Wi austenitic stainless steel plate (0.2 mm in thickness) and SUS329J4L of high corrosion resistability austenitic ferrite duplex stainless steel plate (0.2 mm in thickness), and for comparison purposes, SUS329J1 (layer thickness is 0.16 mm) with Al-SUS329J1 of aluminum (layer thickness is 40 μm) and SUS329J1 stainless steel element only (thickness is 0.2 mm) as shown in FIG. 5. Using the above positive electrode cases, the electrochemical cell (electric double layer capacitor) shown in FIG. 1 is assembled. Specifically active carbon fiber (specific surface in 2000 $m^2/g$ for polarizable electrode) is pressed first in the shape of a disc, second such disc type cloth is inserted into the inside bottom surface of each of the aforsaid positive electrode case 11 and negative electrode case 16 and thereafter an electro-conductive paste 13, 13' is applied as a film, and thirdly it is dried for 2 hours at the temperature of 100° C. after crimping. For a positive electrode which is processed as above, a disc-shaped separator 14 is set which is made of glass fiber filter through and subjected to a drying process of 30 minutes at the temperature of 200° C., and then is filled with an organic electrolytic liquid in which 1mole/l of. Boron fluoride of tetra ethyle phosphoric acid is dissolved, and the the positive electrodes are assembled and negative electrode in one form after a polypropylene gasket 15 is forced into the negative electrode.

Concerning the cells above, Table 4 shows the decrease ratio of capacity and the increase ratio of AC in impedance (measured at 1 kHz) after 500 hours in an atmosphere of 70° C., with 2.8 V applied, and burr occurring ratio of stainless steel or aluminum burr during at the process of assembling a cell of a positive electrode case and a negative electrode case in one form and bending and shielding the edge of the aforesaid positive electrode case towards the inside surface. A, B, C, D shows respectively SUS317J4L, SUS329J4L, Al/SUS329J1, SUS329J1 which is used for the positive electrode of an electrochemical cell.

[TABLE 4]

| Cell | Decrease ratio of capacity (%) | Increase ratio of AC impedance (%) | Burr occuring ratio (%) |
|---|---|---|---|
| A | −4.3 | +15 | 0 |
| B | −5.5 | +18 | 0 |
| C | −8.1 | +24 | 9.6 |
| D | −35.6 | +53 | 0 |

According to Table 3, a better result is realized for a positive electrode case of the present invention which is without an aluminum layer than in that of c which has an aluminum layer, and the prior art positive electrode case which has no aluminum layer shows sharp ratios of change and therefore shows less reliability. Burrs during the process of cell shielding cannot found in A and B of the present invention, and in the case of C there is observed about a 10% burrs occurring ratio of which bars are of aluminum and come off from the aluminum layer.

(Embodiment 4)

Using the organic semiconductor polyalkene for the positive and negative electrode cells, cells are assembled in the same manner and conditions of the embodiment 3. The resulting characteristics are shown in table 5, in which for A, B, C, D the same positive electrode cases as in the embodiment 3 are used.

[TABLE 5]

| Cell | Decrease ratio of capacity (%) | Increase ratio of AC impedance (%) | Burr occuring ratio (%) |
|---|---|---|---|
| A | −3.5 | +14 | 0 |
| B | −5.4 | +19 | 0 |
| C | −9.0 | +30 | 7.6 |
| D | −29.1 | +61 | 0 |

(Embodiment 5)

Using polyalkene for the positive electrode, and Lithium-doped polyalkene and propylene carbonate with 0.5 mol. of dissolved lithium perchlorate for the negative electrode, the cells are assembled in the same manner and conditions of the embodiment 3. Concerning these cells, Table 6 shows the decrease ratio of capacity and the increase ratio of AC impedance (measured at 1 kHz) after 500 hours in an atmosphere at 60° C., with 3.3 V applied, and burr occurring ratio. For A, B, C, D in table 6 used the same positive electrode cases are used, respectively, as in the embodiment 3.

[TABLE 6]

| Cell | Decrease ratio of capacity (%) | Increase ratio of AC impedance (%) | Burr occuring ratio (%) |
|---|---|---|---|
| A | −5.9 | +18 | 0 |
| B | −6.8 | +23 | 0 |
| C | −9.7 | +34 | 7.1 |
| D | 28.0 | +76 | 0 |

(Embodiment 6)

Using manganese dioxide for the positive electrode, and Lithium metal and an organic electrolyte liquid comprised of a mixed solution of propylene carbonate and DME with 1 mol of dissolved lithium perchlorate for the negative electrode, the cells are assembled in the same manner and conditions of the embodiment 3. Concerning these cells, Table 7 shows the same characteristics as in the embodiment 3, but the observation is made after 500 hours in an atmosphere at 60° C. For A, B, C, D in Table 7 the same positive electrode cases, respectively, as in the embodiment 3 are used.

[TABLE 7]

| Cell | Decrease ratio of capacity (%) | Increase ratio of AC impedance (%) | Burr occuring ratio (%) |
|---|---|---|---|
| A | −3.0 | +12 | 0 |
| B | −4.8 | +14 | 0 |
| C | −6.1 | +21 | 10.2 |
| D | −7.5 | +25 | 0 |

According to the present invention, it is possible to produce materials at a lower cost and with a higher corrosion resistibility to improve the productivity of a cell and moreover to obtain a high pressure tightness electrochemical cell.

What is claimed is:

1. A non-aqueous electrolyte electrochemical cell comprising: a negative electrode; a positive electrode; a non-aqueous electrolyte; and a positive electrode case comprised of an austenitic ferrite two-phase stainless steel having a pitting index between 30.5 and 45, the pitting index being calculated by the formula Cr %+ 3×Mo %+16×N %.

2. A non-aqueous electrolyte electrochemical cell according to claim 1; wherein the austenitic ferrite two-phase stainless steel comprises 4.5% to 13% Ni, 20% to 26% Cr, 2% to 4% Mo and 0.05% to 0.3% N.

3. A non-aqueous electrolyte electrochemical cell comprising: a negative electrode; a positive electrode; a non-aqueous electrolyte; and a positive electrode case comprising a high Ni austenitic stainless steel having a pitting index between 30.5 and 45, the pitting index being calculated by the formula Cr %+3×Mo %+16×N %.

4. A non-aqueous electrolyte electrochemical cell according to claim 3; wherein the high Ni austenitic stainless steel comprises 17% to 31% Ni, 19% to 26% Cr, 2% to 6% Mo and 0.1 to 0.3% N.

5. A non-aqueous electrolyte electrochemical cell according to claim 1; wherein the positive and negative electrodes have a material comprised of polyacene.

6. A non-aqueous electrolyte electrochemical cell according to claim 2; wherein the positive and negative electrodes have a material comprised of polyacene.

7. A non-aqueous electrolyte electrochemical cell according to claim 4; wherein the positive and negative electrodes have a material comprised of polyacene.

8. A non-aqueous electrolyte electrochemical cell according to claim 1; wherein the positive electrode has a material comprised of polyacene and the negative electrode has a material comprised of lithium-doped polyacene.

9. A non-aqueous electrolyte electrochemical cell according to claim 2; wherein the positive electrode has a material comprised of polyacene and the negative electrode has a material comprised of lithium-doped polyacene.

10. A non-aqueous electrolyte electrochemical cell according to claim 4; wherein the positive electrode has a material comprised of polyacene and the negative electrode has a material comprised of lithium-doped polyacene.

11. A non-aqueous electrolyte electrochemical cell according to claim 1; wherein the positive electrode has a material comprised of manganese dioxide and the negative electrode has a material comprised of a lithium metal.

12. A non-aqueous electrolyte electrochemical cell according to claim 2; wherein the positive electrode has a material comprised of manganese dioxide and the negative electrode has a material comprised of a lithium metal.

13. A non-aqueous electrolyte electrochemical cell according to claim 4; wherein the positive electrode has a material comprised of manganese dioxide and the negative electrode has a material comprised of a lithium metal.

14. A non-aqueous electrolyte electrochemical cell comprising: a negative electrode; a positive electrode; a non-aqueous electrolyte; and a positive electrode case comprised of an austenitic ferrite stainless steel.

15. A non-aqueous electrolyte electrochemical cell comprising: a negative electrode; a positive electrode; a non-aqueous electrolyte; and a positive electrode case comprised of a high Ni austenitic stainless steel.

16. A non-aqueous electrolyte electrochemical cell according to claim 14; wherein the positive and negative electrodes have a material comprised of polyacene.

17. A non-aqueous electrolyte electrochemical cell according to claim 14; wherein the positive electrode has a material comprised of polyacene and the negative electrode has a material comprised of lithium-doped polyacene.

18. A non-aqueous electrolyte electrochemical cell according to claim 15; wherein the positive and negative electrodes have a material comprised of polyacene.

19. A non-aqueous electrolyte electrochemical cell according to claim 15; wherein the positive electrode has a material comprised of polyacene and the negative electrode has a material comprised of lithium-doped polyacene.

\* \* \* \* \*